(12) United States Patent
Bhat (10) Patent No.: US 7,765,327 B2
(45) Date of Patent: Jul. 27, 2010

(54) INTERMEDIATE DRIVER HAVING A FAIL-OVER FUNCTION

(75) Inventor: Gangadhar D. Bhat, Beaverton, OR (US)

(73) Assignee: Intel Corporation, Santa Clara, CA (US)

( * ) Notice: Subject to any disclaimer, the term of this patent is extended or adjusted under 35 U.S.C. 154(b) by 316 days.

(21) Appl. No.: 11/217,741

(22) Filed: Sep. 1, 2005

(65) Prior Publication Data

US 2006/0200584 A1    Sep. 7, 2006

Related U.S. Application Data

(63) Continuation of application No. 10/060,127, filed on Jan. 30, 2002, now Pat. No. 6,963,932.

(51) Int. Cl.
    *G06F 15/16* (2006.01)
(52) U.S. Cl. .................................. 709/249; 370/353
(58) Field of Classification Search .................. 709/208, 709/227, 245, 249, 466, 222, 231; 714/4, 714/11; 370/389, 397; 710/129
See application file for complete search history.

(56) References Cited

U.S. PATENT DOCUMENTS

| 5,311,502 | A | | 5/1994 | Mueller et al. ............... 370/221 |
| 5,734,830 | A | * | 3/1998 | Balogh et al. ............... 709/208 |
| 5,740,075 | A | | 4/1998 | Bigham et al. |
| 5,878,232 | A | * | 3/1999 | Marimuthu ................. 709/249 |
| 5,970,066 | A | * | 10/1999 | Lowry et al. ................. 370/353 |
| 5,987,526 | A | | 11/1999 | Morales ....................... 709/249 |
| 6,199,137 | B1 | * | 3/2001 | Aguilar et al. ............... 710/305 |
| 6,253,334 | B1 | * | 6/2001 | Amdahl et al. ................. 714/4 |
| 6,377,992 | B1 | * | 4/2002 | Plaza Fernandez et al. .. 709/227 |
| 6,421,711 | B1 | * | 7/2002 | Blumenau et al. ........... 709/213 |
| 6,438,128 | B1 | * | 8/2002 | Kashyap ..................... 370/389 |
| 6,473,803 | B1 | * | 10/2002 | Stern et al. ................... 709/238 |
| 6,625,675 | B2 | | 9/2003 | Mann .......................... 710/61 |
| 6,651,093 | B1 | | 11/2003 | Wiedeman et al. .......... 709/221 |

(Continued)

OTHER PUBLICATIONS http://developer.intel.com/design/network/products/npfamily/ixp 1200.htm "Intel IXP Network Processor Family." pp. 1-3, Dec. 2001.

(Continued)

*Primary Examiner*—Thong H Vu
(74) *Attorney, Agent, or Firm*—Christopher K. Gagne (57) ABSTRACT

A system to facilitate data transfer between a server and a client in an uninterrupted manner. At least one server network communicates data via a first Input/Output (I/O) architecture. At least two Virtual Network Interface Cards (VNICs) communicate the data via the first I/O architecture. A client network communicates data via a second I/O architecture. At least two bridging devices convert packets useable in the first I/O architecture to packets useable in the second I/O architecture. No more than one of the at least two bridging devices transfers the data with any one of the at least two VNICs, and the at least two bridging devices transfer the data with the client network. At least one intermediate driver binds to the at least one server network and to the at least two VNICs. The at least one intermediate driver provides a fail-over function to maintain a connection between the server network and the client network.

6 Claims, 6 Drawing Sheets

U.S. PATENT DOCUMENTS

| | | | |
|---|---|---|---|
| 6,694,361 B1* | 2/2004 | Shah et al. | 709/222 |
| 6,725,388 B1* | 4/2004 | Susnow | 713/400 |
| 6,766,412 B2* | 7/2004 | Bolt | 711/111 |
| 6,775,719 B1* | 8/2004 | Leitner et al. | 710/33 |
| 6,839,740 B1 | 1/2005 | Kiselev | 709/214 |
| 6,889,380 B1* | 5/2005 | Shah | 719/327 |
| 6,898,730 B1* | 5/2005 | Hanan | 714/7 |
| 6,944,785 B2* | 9/2005 | Gadir et al. | 714/4 |
| 6,944,786 B2* | 9/2005 | Kashyap | 714/4 |
| 6,971,044 B2* | 11/2005 | Geng et al. | 714/11 |
| 7,007,080 B2 | 2/2006 | Wilson | |
| 7,020,669 B2* | 3/2006 | McCann et al. | 707/206 |
| 7,032,037 B2* | 4/2006 | Garnett et al. | 710/2 |
| 7,039,827 B2* | 5/2006 | Meyer et al. | 714/4 |
| 7,039,922 B1* | 5/2006 | Shah et al. | 719/326 |
| 7,068,666 B2* | 6/2006 | Foster et al. | 370/397 |
| 7,133,907 B2* | 11/2006 | Carlson et al. | 709/220 |
| 7,174,390 B2* | 2/2007 | Schulter et al. | 709/245 |
| 7,194,263 B2* | 3/2007 | Bahl et al. | 455/432.1 |
| 7,197,047 B2* | 3/2007 | Latif et al. | 370/466 |
| 7,243,142 B2 | 7/2007 | Poirot et al. | |
| 7,299,290 B2* | 11/2007 | Karpoff | 709/231 |
| 7,356,841 B2 | 4/2008 | Wilson et al. | |
| 2002/0010866 A1 | 1/2002 | McCullough et al. | 713/201 |
| 2002/0016926 A1* | 2/2002 | Nguyen et al. | 713/201 |
| 2002/0051427 A1* | 5/2002 | Carvey | 370/254 |
| 2002/0169884 A1 | 11/2002 | Jean et al. | |
| 2002/0184310 A1 | 12/2002 | Traversat et al. | 709/204 |
| 2002/0194389 A1 | 12/2002 | Worley et al. | 709/310 |
| 2003/0112582 A1* | 6/2003 | Sanders et al. | 361/600 |
| 2003/0131128 A1* | 7/2003 | Stanton | 709/238 |
| 2003/0231643 A1 | 12/2003 | Gilchrist et al. | 370/401 |
| 2004/0213220 A1* | 10/2004 | Davis | 370/389 |

OTHER PUBLICATIONS

U-Net/SLE: A Java-based User-Customizable Virtual Network . .—Welsh, Oppenheimer . . . , www.cs.berkeley.edu/~davidopp/pubs/unet-europar.ps.gz, Jul. 7, 1998.

Evolution of Groupware for Business Applications ..—Mohan, Barber . . . (2000) www.almaden.ibm.com/u/mohan/Domino_VLDB2000.pdf.

A Programmable ATM MulticastSetica with Conge Control—Hung Kengpung Naftali (2000) searh.ieice.org/2000/files/../pdf/e83-b_2_253.pdf.

Practical Cluster Applications of Group Communication—Amir, Gu, Schlossnagle . . (2000) www.cnds.jhu.edu/pub/papers/clusterapp_dsn2000.ps.gz.

Sieh, V. et al., "Testing the Fault-Tolerance of Networked Systems", Workshop Proceedings of International Conference on Architecture of Computing Systems ARCS 2002, pp. 95-105.

Buchacker, K. et al., "Framework for testing the fault-tolerance of systems including OS and network aspects", Sixth IEEE International Symposium on High Assurance Systems Engineering, 2001, pp. 95-105.

Okumura, T. et al., "Operating system support for network control: a virtual network interface approach for end-host OSs", Tenth IEEE International Workshop on Quality of Service, May 15-17, 2002, pp. 170-179.

Chiu,Shih-Yen et al., "Providing mobile LAN access capability for Bluetooth devices", Proceedings of Ninth International Conference on Parallel and Distributed Systems, Dec. 17-20, 2002, pp. 631-636.

* cited by examiner

INTERMEDIATE DRIVER HAVING A FAIL-OVER FUNCTION

This application is a continuation application of utility application Ser. No. 10/060,127, filed Jan. 30, 2002, now U.S. Pat. No. 6,963,932, entitled "Intermediate Driver Having a Fail-Over Function For A Virtual Network Interface Card In A System Utilizing Infiniband Architecture", filed Jan. 30, 2002, and issued on Nov. 8, 2005.

BACKGROUND

1. Technical Field

An embodiment of this invention relates to the field of data transfer between a server and a client and, more specifically, to a system, method, and apparatus for using an intermediate driver to allow an InfiniBand™ server to transfer data with an Ethernet client, where the intermediate driver provides a "fail over" function to improve system performance.

2. Description of the Related Arts

Computers in a network often communicate and transfer data with each other. A "client" computer can request data from a "server" computer, and the server can transfer the requested data to the client. In a large network, there can be many client computers transferring data with a single server.

A problem arises when a server is transferring data to a client, and a Network Interface Card (NIC) at the server malfunctions. In such a situation, the entire connection between the server and the rest of the clients coupled to the server is disrupted. The problem is magnified when the server utilizes a more efficient and high speed Input/Output (I/O) technique, such as Infiniband I/O architecture.

InfiniBand™, release 1.0.a, published Jul. 19, 2001, is a technology developed by a consortium of companies, the Infiniband Trade Association, in the computer industry. It provides a way to move information among the components of a computer system and among computers. InfiniBand enables computer CPUs to communicate directly with I/O devices and other CPUs with very high performance. The technology is defined in an open industry specification.

InfiniBand provides a modular performance hierarchy that is faster than other standards-based I/O mechanisms currently in use. InfiniBand is considered the eventual successor to the peripheral component interconnect (PCI) bus, which has become a bottleneck to new and high speed CPUs and a source of reliability problems.

When a server is utilizing Infiniband to transfer data to a client utilizing an Ethernet IEEE 802.3, published 1985, a faulty link on the Ethernet side of the network cannot be directly communicated to the Infiniband host because the Infiniband host has a different I/O architecture and utilizes packets having a format that is not directly compatible with Ethernet.

Infiniband technology is targeted for the back end of a data center of any network. On the front end and in the middle end of the network infrastructure, legacy Ethernet technology prevails. In other words, Infiniband and Ethernet technology can co-exist in a given network. To achieve data transfer between two heterogeneous systems, a form of conversion device or a bridge device is necessary. Such a bridge, often called an "Infiniband-Ethernet" bridge, converts Infiniband packets into Ethernet packets, and vice-versa. Some present systems provide such a conversion but lack a "fail-over" capability. Fail-over is a function utilized to maintain a connection for a data transfer. In a device having a fail-over feature, there are typically two or more data input paths and two or more data output paths. When there is an error in one of the data input or output paths, a separate idle input or output path is used in place of the failed input or output path, therefore maintaining the connection so that data can transfer.

A fail-over feature hence provides undisrupted network connection. Current systems are therefore deficient because they do not provide a fail-over feature for Infiniband-Ethernet bridges.

DETAILED DESCRIPTION

An embodiment of the invention allows data to be transferred from a server utilizing a high speed Input/Output (I/O) architecture, such as Infiniband, to a client operating a different I/O architecture, such as Ethernet. Infiniband devices and Ethernet devices transmit data via packets having different, non-compatible formats. Therefore, an Ethernet device cannot directly transmit a packet to an Infiniband device, and vice-versa. An embodiment of the present invention is directed to a system, method, and apparatus to use an intermediate driver to transmit data from a server utilizing Infiniband to a client using Ethernet in an undisrupted manner. The intermediate driver may provide a "fail over" function that ensures data correctly transfers between a client and a server.

Figure 1:
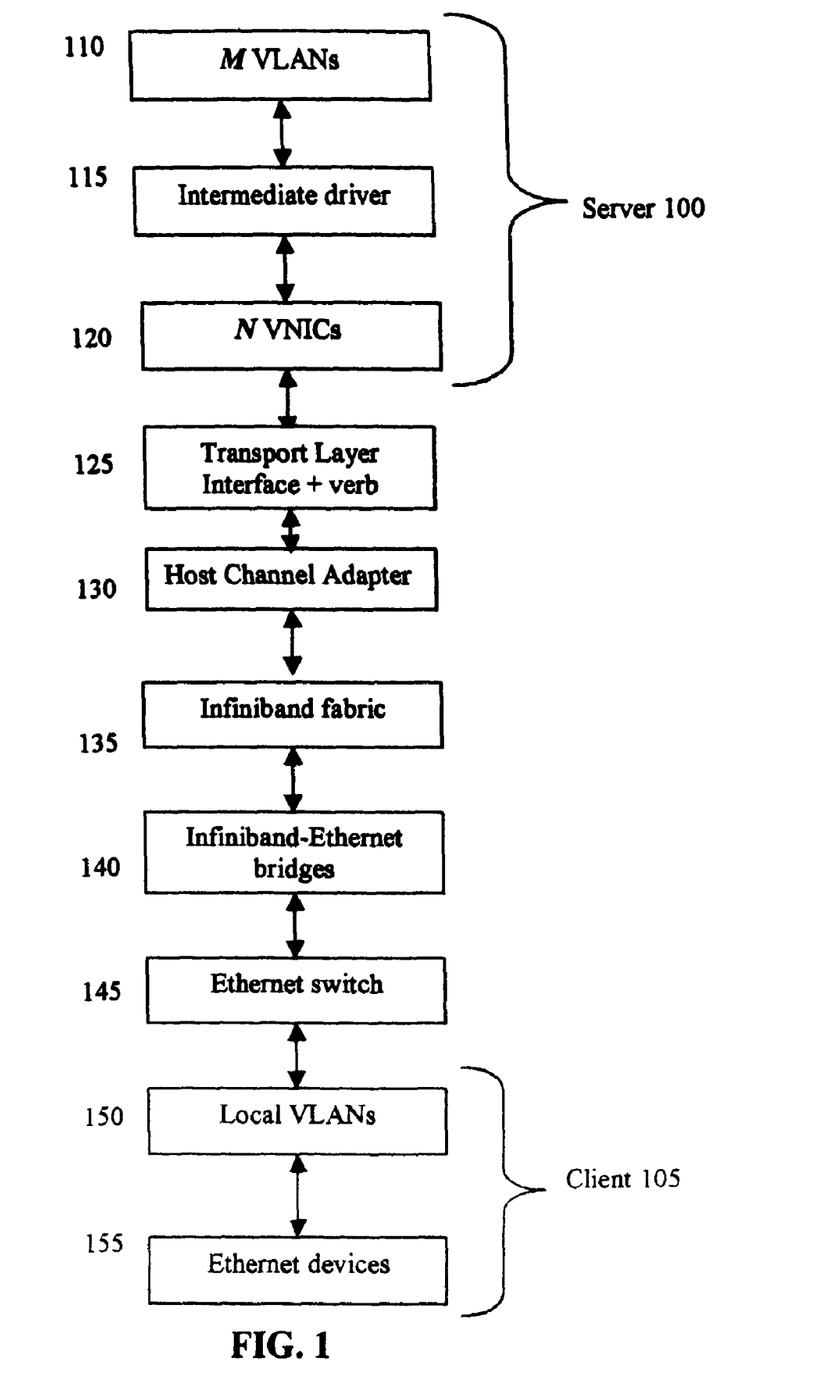
FIG. 1 illustrates a block diagram showing devices utilized to transfer data from a Virtual Local Area Network (VLAN) at an Infiniband server transmitting data to an Ethernet client according to an embodiment of the invention.

FIG. 1 illustrates a block diagram showing devices utilized to transfer data from Virtual Local Area Networks (VLAN) 110, IEEE 802.1Q published 1998, at a server 100 transmitting data via Infiniband to a client 105 receiving data via Ethernet according to an embodiment of the invention. The system allows the server 100 to be represented by multiple VLANs, for example M VLANS 110. In other embodiments, the M VLANs 110 may not be necessary—the server 100 may instead be located in a single computer, for example. The server 100 may be a server for a backbone network, such as a data center. A local or remote user may desire to access data located within a memory located in the M VLANs 110. The server 100 or database may be supported by M VLANs 110 to allow the server or database to operate as quickly and efficiently as possible.

Because Infiniband and Ethernet utilize different protocols and packet formats, an Infiniband packet must be converted into an Ethernet format before it can be received by a Ethernet client 105. As illustrated in FIG. 1, the M VLANs 110 are coupled to an intermediate driver 115. The intermediate driver 115 may be a Microsoft Network Driver Interface Specification (NDIS), published 1998, driver used to create M virtual miniport instances on top of N virtual adapters. NDIS is a network driver interface specification from Microsoft. A network driver interface is a software interface between the transport protocol and the data link protocol (i.e., network driver). The interface provides a protocol manager that accepts requests from the transport layer and activates the network adapter. Network adapters with compliant network drivers can be freely interchanged. This method allows multiple protocol stacks to run over one network adapter.

A "miniport instance" is a connection between a local device and a Virtual Network Interface Card (VNIC) via the intermediate driver 115. A miniport driver is utilized to create each miniport instance. A miniport driver is a driver that contains device-specific information. It is typically written by the card manufacturer to implement the part of the media access layer that is specific to that particular card. Miniport drivers typically implement functions such as establishing communications with an adapter, media detection, Plug and Play, and card-specific functions. The miniport driver may communicate with an NDIS wrapper provided by Microsoft, for example, to communicate with the transport protocols.

As shown in FIG. 1, the intermediate driver 115 is also coupled to N VNICs 120. The N VNICs 120 may be physical device objects that represent remote targets. In FIG. 1, remote targets are located on the Ethernet side of the Infiniband-Ethernet bridges 140. The N VNICS 120 are utilized to send data through the Infiniband (IB) transport layer interface and verb 125, a Host Channel Adapter 130, and an Infiniband fabric 135. The Infiniband verb interface provides a semantic mechanism to operate the Infiniband channel. Channel adapters that reside on a host end node are required to abide by the verb interface. The Infiniband fabric 135 may include a plurality of switches utilized to route Infiniband packets from one link to another. After a packet has been sent through the Infiniband fabric 135, one of the Infiniband-Ethernet bridges 140 may receive it. The Infiniband-Ethernet bridges 140 convert an Infiniband packet into an Ethernet packet. Each of the Infiniband-Ethernet bridges 140 has two sides: an Infiniband side and an Ethernet side. Infiniband packets are received and transmitted via the Infiniband side, and Ethernet packets are transmitted and received via the Ethernet side. Such Infiniband-Ethernet bridges 140 may be implemented using generic network processors, such as the Intel IXP 1200 series network processor. The Infiniband-Ethernet bridges 140 may be bi-directional. In other words, Ethernet packets may also be received by the Infiniband-Ethernet bridges 140, converted to Infiniband packets, and transmitted to the Infiniband server 100 through a Host Channel Adapter 130 interface, and vice-versa. Accordingly, the Infiniband-Ethernet bridges 140 may include circuitry to convert the packets from Infiniband to Ethernet, and vice-versa. The Infiniband-Ethernet bridges 140 include a plurality of bridges, some of which may be idle at a given time.

Infiniband packets converted (reassembled) into Ethernet packets may be transmitted to Ethernet devices 155 by bridges 140 through the Ethernet switch 145. The Ethernet switch 145 may be replaced with an Ethernet router if necessary for a particular application. Ethernet switch 145 may send Ethernet data packets to designated Ethernet devices (e.g., an Ethernet Network Interface Card) 155. Local VLANs 150 may be configured to send packets to designated Ethernet devices 155 through the respective VLAN 150, as explained in further detail below with respect to FIG. 5.

Data packets have only been described as flowing from the server 100 to the client 105. However, data packets may also flow from the client 105 to the server 100 via a similar method.

In situations where data is transferred between a server 100 and a client 105, it is important that the integrity of data connection be maintained. A situation may arise where Infiniband packets correctly flow from the M VLANs 110 all the way through to the Infiniband-Ethernet bridge 140. However, if the link between Ethernet switch 145 and the Ethernet side of the Infiniband-Ethernet bridge 140 is broken, then data cannot be transferred down to the local VLANs 150 and hence to the clients 105. If such an error occurs, the clients 105 cannot receive data packets from the M VLANs 110. By the same token, data sent from clients 105 cannot reach the Infiniband-Ethernet bridges 140.

An embodiment of the invention solves the above-mentioned problem by implementing a "fail-over" feature. Fail-over is a function utilized to maintain a connection for data transfer. In a device having a fail-over feature, there are typically two or more data input paths and two or more data output paths. When there is an error in one of the data input or output paths, a separate idle input or output path is used in place of the failed input or output path, therefore maintaining the connection so data can transfer. A fail-over feature therefore provides an undisrupted network connection. The current or active Ethernet side of a bridge in the Infiniband-Ethernet bridges 140 may detect a link failure in one of the bridges of the Infiniband-Ethernet bridges 140 at the Ethernet side of the failed bridge connected to Ethernet switch 145. A host command handler (software driver) at the Infiniband-Ethernet bridges 140 may then send an error message to the VNIC counterpart 120 of the failed bridge at the Infiniband server 100. The respective VNIC 120 echoes this error message to intermediate driver 115. The fail-over functionality of the intermediate driver 115 stops using the failed VNIC 120, and correspondingly the failed bridge of the Infiniband-Ethernet bridges 140. The fail-over function of the intermediate driver 115 then switches to the back-up instance of the VNIC 120 and starts using the back-up bridge. In other words, in a situation where there are two bridges in the Infiniband-Ethernet bridges 140, only one of which is utilized at a given time, if one of the bridges fails, the other bridges take over for the failed bridge. The fail-over function of the intermediate driver 115 therefore enables the back-up VNIC 120, and in turn back-up Infiniband-Ethernet bridge 140, to become active and makes the failed Infiniband-Ethernet bridge 140 the back-up. One may then replace the failed Infiniband-Ethernet bridge 140 with a hot plug capability. Each particular VNIC instance corresponds to one particular bridge in the Infiniband-Ethernet bridges 140.

Figure 2:
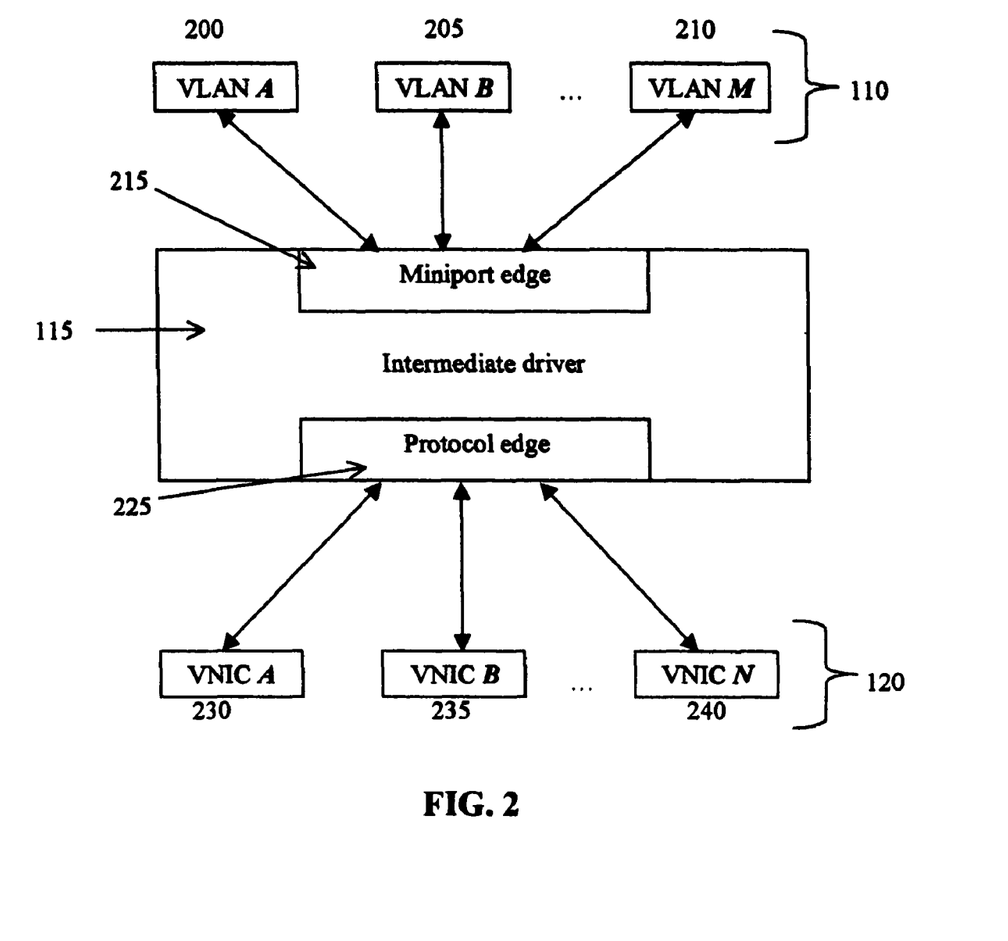
FIG. 2 illustrates an intermediate driver coupled to a plurality of Virtual Local Area Networks (VLANs) and a plurality of Virtual Network Interface Cards (VNICs) according to an embodiment of the invention.

FIG. 2 illustrates an intermediate driver 115 coupled to a plurality of VLANs 110 and a plurality of VNICs 120 according to an embodiment of the invention. M VLANs 110 may be utilized, such as VLAN A 200, VLAN B 205, and so on, up to VLAN M 210. The intermediate driver 115 may have a miniport edge 215, through which miniport instances are established with each of the M VLANs 110. The intermediate driver 115 may have a protocol edge 225 through which all the received packets at the VNIC A 230, VNIC B 235 and so on up to VNIC N 240 are indicated to the VLANs. In other words, each of N VNICs 120, such as VNIC A 230, VNIC B 235, and so on, up to VNIC N 240 are coupled to the intermediate driver 115 through the protocol edge 225.

The intermediate driver 115 supports the "fail over" feature described above with respect to FIG. 1. The intermediate driver 115 may also support other features, such as Virtual Local Area Network (VLAN) and Internet Protocol Security (IPSec). VLAN is a protocol that allows for the creation of virtual local area networks. IPSec is an Internet Protocol (IP) security feature and is a proposed IP security standard. The use of VLANs was originally an Ethernet concept. However, the intermediate driver 115 may be utilized to provide support for legacy Ethernet VLANs 110 in an Infiniband environment. If the intermediate driver 115 were not used, then separate drivers would have to be used to provide the VLAN and IPSec features. However, because these features may be incorporated into a single intermediate driver 115, less maintenance time is necessary when changing settings. In other words, it is much simpler and quicker to change the registry parameters for a single intermediate driver 115 than it would be to change the registry parameters of three separate drivers. The use of a single intermediate driver 115 is much easier to understand and configure.

Figure 3:
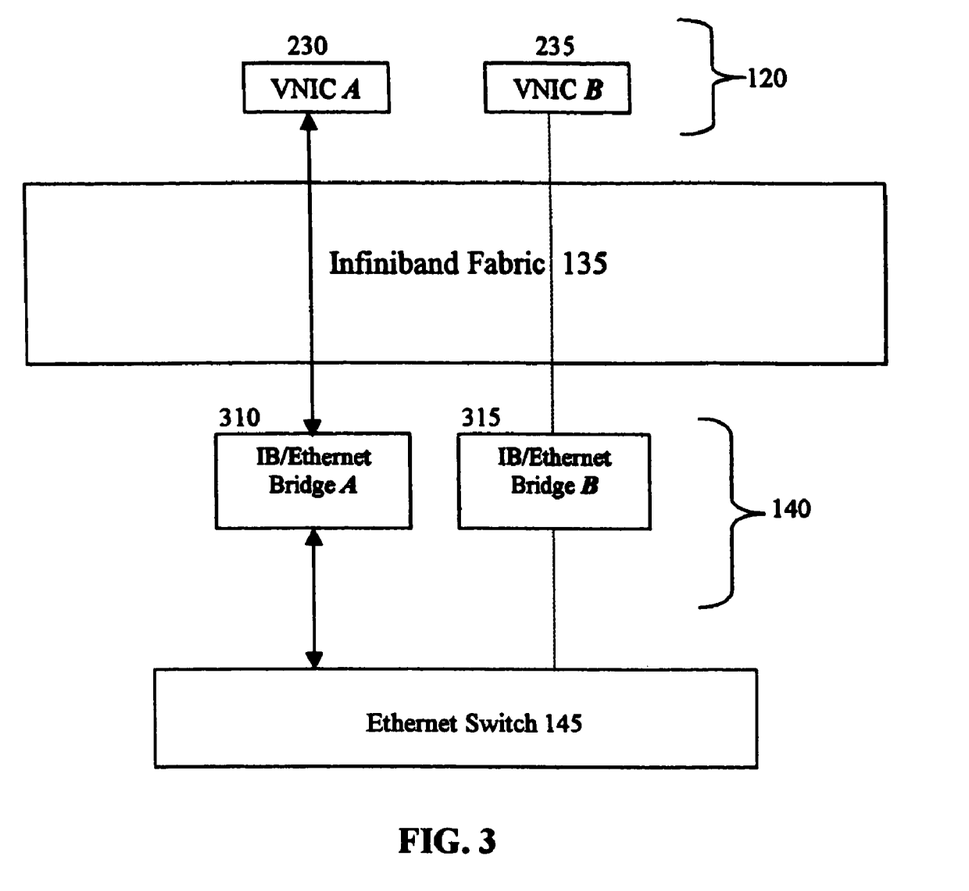
FIG. 3 illustrates Virtual Network Interface Cards (VNICs) communicating data across an Infiniband fabric with Infiniband/Ethernet bridges according to an embodiment of the invention.

FIG. 3 illustrates VNICs A 230 and B 235, where VNIC A 230 communicates data across Infiniband fabric 135 with Infiniband-Ethernet bridge A 310 according to an embodiment of the invention. As shown, a connection is established between VNIC A 230 and the Infiniband (IB)/Ethernet bridge A 310. IB/Ethernet Bridge A 310 is connected to Ethernet Switch 145. In FIG. 3, VNIC B 235 is idle and corresponds to Infiniband (IB)/Ethernet Bridge B 315. VNIC B 235 and Infiniband-Ethernet bridge B 315 may serve as back-ups to VNIC A 230 and Infiniband-Ethernet bridge A 310. In other words, both bridge A 310 and bridge B 315 belong to the same fail-over team. Both the bridges A 310 and B 315 may also be programmed to the same Ethernet Media Access Control (MAC) address.

Figure 4:
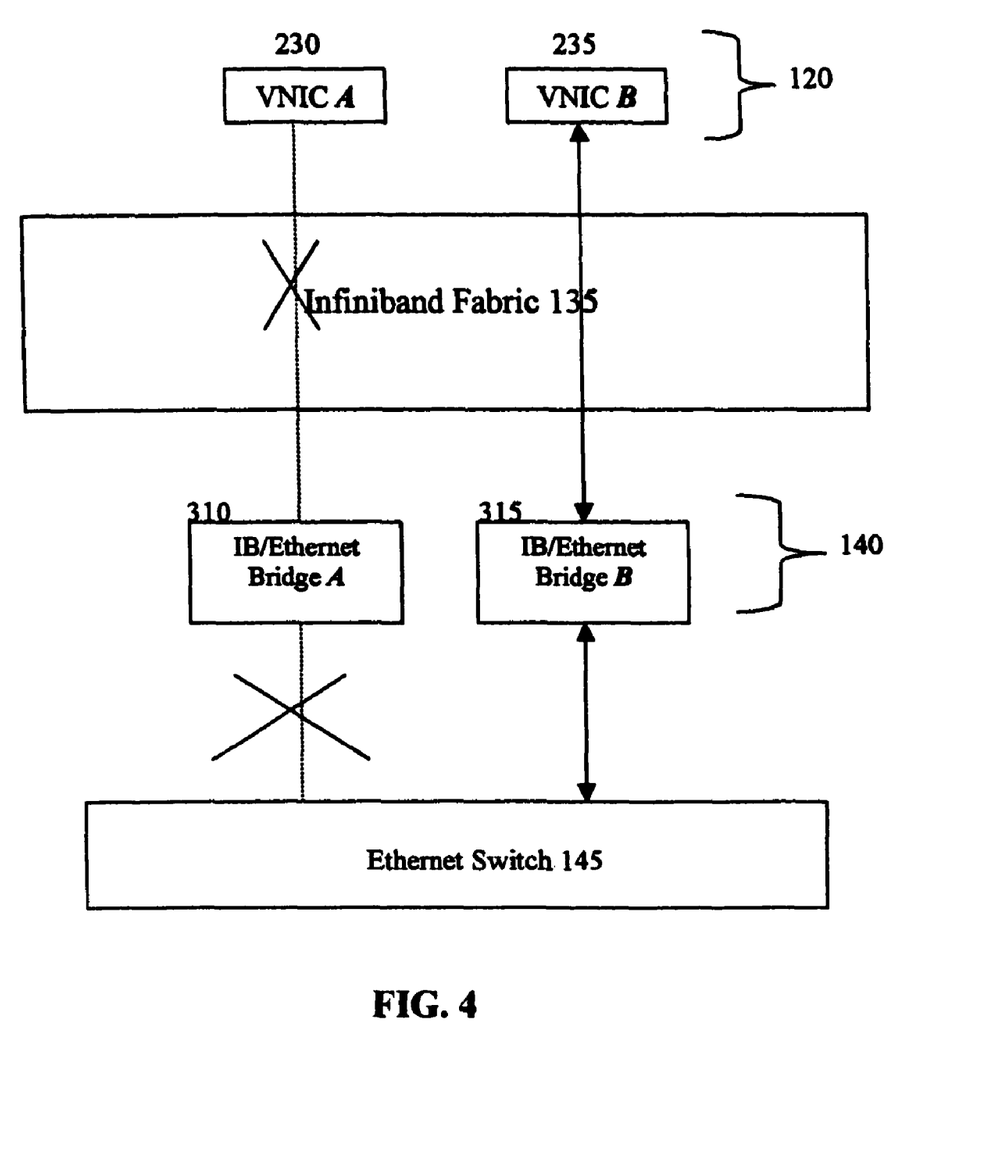
FIG. 4 illustrates Virtual Network Interface Cards (VNICs) communicating data across an Infiniband fabric with Infiniband/Ethernet bridges when a bridge fails according to an embodiment of the invention.

FIG. 4 illustrates the back-up VNIC B 235 and Infiniband-Ethernet bridge B 315 replacing VNIC A 230 and Infiniband-Ethernet bridge A 310 when the connection between Infiniband-Ethernet bridge A 310 and Ethernet switch 145 fails according to an embodiment of the invention. Whenever Infiniband-Ethernet bridge A 310 detects the link failure, a host command handler (software driver) of this bridge A 310 sends an error message to VNIC A 230 at the Infiniband server 100. VNIC A 230 may in turn notify this link failure error message to the intermediate driver 115. The intermediate driver 115 then switches to the back-up VNIC B 235 and hence to Infiniband-Ethernet bridge B 315. Intermediate driver 115 may mark VNIC A 230 as failed, and mark VNIC B 235 as active. The same failed Infiniband-Ethernet bridge A 310 may be used as a backup once the lost link re-establishes or can be replaced with a good bridge by using hot plug technology. Accordingly, the "fail-over" feature of the intermediate driver 115 prevents the connection from being lost. The Infiniband-Ethernet bridge B 315 may have the same MAC address as the Infiniband-Ethernet bridge A 310. A MAC address is a unique 48-bit Ethernet address burned into the bridge at the time of manufacture. A MAC address may uniquely identify an Infiniband-Ethernet bridge.

The VNICs 120 are therefore utilized to implement the fail-over feature. The VNICs 120 receive error messages when the transfer of data between one of the bridges in the Infiniband-Ethernet bridges 140 and the Ethernet switch 145 fails. Because an error message cannot be sent from the Ethernet switch 145 directly to the server 100, the host command hander at the Infiniband-Ethernet bridge 140 is used instead to determine when the data transfer fails. Once the host command hander at the Infiniband-Ethernet bride 140, detects an error such as bad link, it then reports the error to the respective VNIC 120 at the server 100.

Figure 5:
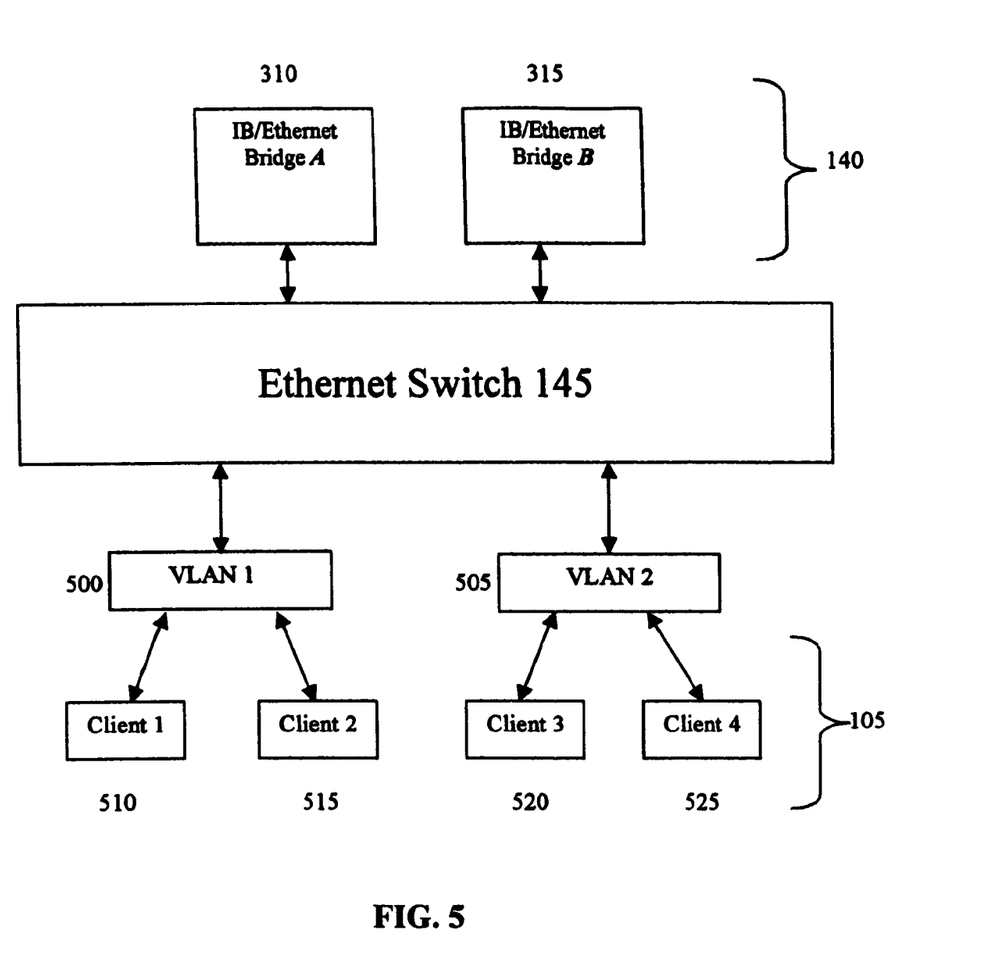
FIG. 5 illustrates Infiniband/Ethernet bridges coupled with an Ethernet switch, which is coupled to remote Virtual Local Area Networks (VLANs) and clients according to an embodiment of the invention.

FIG. 5 illustrates an Ethernet switch 145 coupled with Infiniband-Ethernet bridges 140 and legacy Ethernet VLANs 500 and 505. As shown, Ethernet clients 105 "1" 510, "2" 515, "3" 520, and "4" 525 belong to VLAN "1" 500 and VLAN "2" 505, respectively. Ethernet packets are transferred between the Ethernet clients 105 and the Infiniband server 100 through the Ethernet switch 145 and the Infiniband-Ethernet bridges 140. For example, the Ethernet side of Infiniband-Ethernet bridge A 310 is coupled to Ethernet switch 145. Ethernet switch 145 is also coupled to legacy Ethernet VLANs such as VLAN "1" 500 and remote VLAN "2" 505. Clients "1" 510 and "2" 515 are coupled to remote VLAN "1" 500. Clients "3" 520 and "4" 525 are coupled to remote VLAN 505.

For a packet to transfer from Infiniband-Ethernet bridge A 310 to client "1" 510, for example, the packet must go from the Ethernet side of Infiniband-Ethernet bridge A 310 to Ethernet switch 145, through legacy Ethernet VLAN "1" 500, and then to client "1" 510. Packets may also flow from client "1" 510 to Infiniband-Ethernet bridge A 310 is a similar manner.

Figure 6:
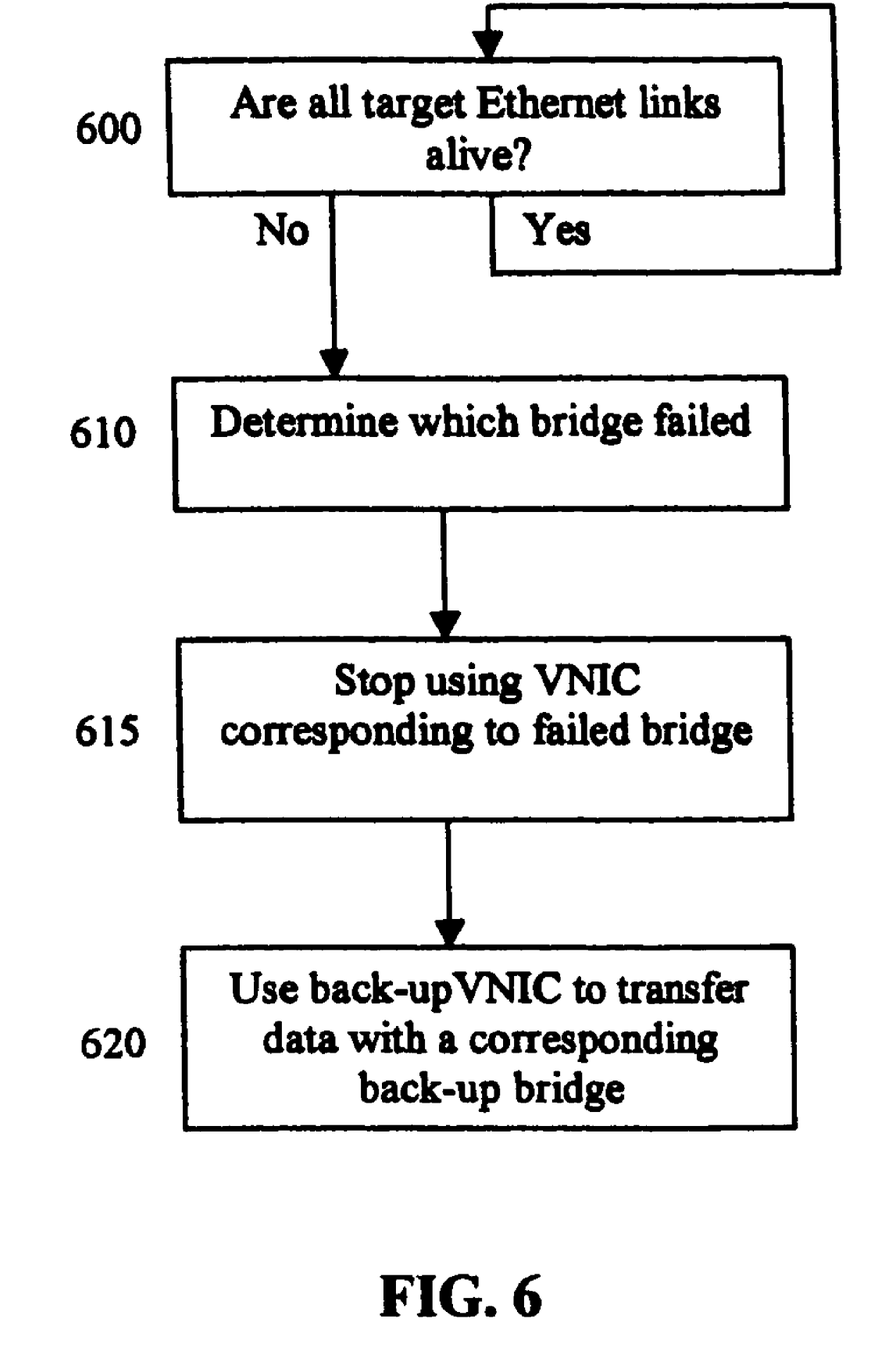
FIG. 6 illustrates a process to determine whether an Infiniband to Ethernet Bridge has failed and, if so, to invoke the "fail over" function according to an embodiment of the invention.

FIG. 6 illustrates a process to determine whether a target Ethernet link has failed and, if so, to invoke the "fail over" function according to an embodiment of the invention. First, the system determines 600 whether all target Ethernet links (i.e., links between the Ethernet switch 145 and each of the bridges used in the Infiniband-Ethernet bridges 140) are alive. If all are alive, processing remains at operation 600. Otherwise, processing proceeds to operation 605. At operation 605, the system determines which bridge of the Infiniband-Ethernet bridges 140 has failed. Next, the intermediate driver 115 causes the system to stop 610 using the VNIC corresponding to the failed Infiniband-Ethernet bridge. A back-up VNIC is then utilized 615 to transfer data with a corresponding back-up bridge. Processing then returns to operation 600.

As discussed above, an embodiment of the invention allows data to be transferred from a server 100 utilizing a high speed I/O architecture, such as Infiniband, to a client 105 operating a different I/O architecture, such as Ethernet. Because Infiniband devices and Ethernet devices transmit data via packets having different, non-compatible formats, an Ethernet device cannot directly transmit a packet to an Infiniband device, and vice-versa. An embodiment of the present invention uses an intermediate driver 115 to transmit data from an Infiniband server 100 to an Ethernet client 105 in an undisrupted manner. The intermediate driver 115 communicates with N VNICs 120, each of which represent a particular Infiniband-Ethernet bridge. When data flow through one of the bridges 140 is disrupted, or stops completely, the intermediate driver 115 may be notified of the error through the use of the N VNICs 120. In the event of such an error, the intermediate driver 115 may use the N VNICs 120 to stop the data flow through the faulty bridge, and instead transmit data through a different bridge. Accordingly, the intermediate driver 115 supports a "fail-over" function.

While the description above refers to particular embodiments of the present invention, it will be understood that many modifications may be made without departing from the spirit thereof. The accompanying claims are intended to cover such modifications as would fall within the true scope and spirit of an embodiment of the present invention. The presently disclosed embodiments are therefore to be considered in all respects as illustrative and not restrictive, the scope of the invention being indicated by the appended claims, rather than the foregoing description, and all changes which come within the meaning and range of equivalency of the claims are therefore intended to be embraced therein.

What is claimed is:

1. A method comprising:
   transceiving data between a server and a client from a first of a plurality of VNICs (virtual network interface controllers);

receiving from a first driver at a multi-protocol bridge coupled between the server and the client an error message in the first of the plurality of VNICs;

echoing, by the first of the plurality of VNICs, the error message to a second driver, the driver including fail-over functionality;

in response to the error message, switching, by the second driver, to another of the plurality of VNICs in the network and to another multi-protocol bridge that corresponds to the other of the plurality of VNICs;

enabling, by the second driver, the other of the plurality of VNICs and the other multi-protocol bridge to become active from an inactive condition; and transceiving subsequent data between the client and the server using the other of the plurality of VNICs and discontinuing using the first VNIC, wherein the client and the server are to transmit respective data via respective packets having respective different formats, and the bridges are to perform packet format conversion between the respective different formats.

2. The method of claim 1, wherein the error message indicates a link failure in a bridge corresponding to the one of the plurality of VNICs.

3. The method of claim 2, wherein the bridge having the link failure comprises an Infiniband™-Ethernet bridge.

4. The method of claim 1, wherein the server operates under an Infiniband™ architecture, and the client operates under an Ethernet architecture.

5. An apparatus comprising:
an intermediate driver to:
transceive data between a server and a client from one of a plurality of VNICs (virtual network interface cards);
receive from another driver at a multi-protocol bridge coupled between the server and the client an error message echoed from one of the plurality of VNICs;
in response to the error message,
switch to another of the plurality of VNICs in the network and to another multi-protocol bridge that corresponds to the other of the plurality of VNICs;

enabling the other of the plurality of VNICs and the other multi-protocol bridge to become active from an inactive condition; and transceive subsequent data between the client and the sever using the other of the plurality of VNICs, wherein the client and the server are to transmit respective data via respective packets having respective different formats, and the bridges are to perform packet format conversion between the respective different formats.

6. A system comprising:
a plurality of VNICs (virtual network interface cards) to communicate data from a server to an Ethernet client across a fabric;
a plurality of VLANs (virtual local area networks);
at least one intermediate driver coupled to the VNICs and VLANs to:
transceive the data between the server and the client from one of the plurality of VNICs;
receive from another driver at a multi-protocol bridge coupled between the server and the client an error message echoed from the one of the plurality of VNICs;
in response to the error message, switch to another of the plurality of VNICs in the network and to another multi-protocol bridge that corresponds to the other of the plurality of VNICs;
enable the other of the plurality of VNICs and the other multi-protocol bridge to become active from an inactive condition; and
transceive subsequent data between the server and the client using the other of the plurality of VNICs, wherein the client and the server are to transmit respective data via respective packets having respective different formats, and the bridges are to perform packet format conversion between the respective different formats.

* * * * *

UNITED STATES PATENT AND TRADEMARK OFFICE
CERTIFICATE OF CORRECTION

PATENT NO. : 7,765,327 B2
APPLICATION NO. : 11/217741
DATED : July 27, 2010
INVENTOR(S) : Gangadhar D. Bhat It is certified that error appears in the above-identified patent and that said Letters Patent is hereby corrected as shown below:

In column 1, in line 4, below Title, insert -- CROSS-REFERENCE TO RELATED APPLICATION --.

Signed and Sealed this

Ninth Day of November, 2010

David J. Kappos
*Director of the United States Patent and Trademark Office*